US010641703B2

(12) United States Patent
Peng et al.

(10) Patent No.: US 10,641,703 B2
(45) Date of Patent: May 5, 2020

(54) METHOD OF ENHANCING ABSORPTION SPECTRAL SIGNALS OF BIOLOGICAL SAMPLES IN TERAHERTZ WAVEBANDS

(71) Applicant: University of Shanghai for Science and Technology, Shanghai (CN)

(72) Inventors: Yan Peng, Shanghai (CN); Tengfei Zhang, Shanghai (CN); Yiming Zhu, Shanghai (CN); Bowei Xu, Shanghai (CN); Wanqing Chen, Shanghai (CN); Binbin Qi, Shanghai (CN); Xiuping Zhang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 71 days.

(21) Appl. No.: 16/024,754

(22) Filed: Jun. 30, 2018

(65) Prior Publication Data

US 2018/0306712 A1 Oct. 25, 2018

Related U.S. Application Data

(63) Continuation of application No. PCT/CN2016/000612, filed on Nov. 7, 2016.

(30) Foreign Application Priority Data

Jan. 7, 2016 (CN) .......................... 2016 1 0007806

(51) Int. Cl.
*G01N 21/3581* (2014.01)
*G01N 21/3586* (2014.01)
(Continued)

(52) U.S. Cl.
CPC ........... *G01N 21/3581* (2013.01); *G01N 1/36* (2013.01); *G01N 21/3586* (2013.01); *G01N 1/42* (2013.01); *G01N 2001/368* (2013.01)

(58) Field of Classification Search
CPC ............... G01N 21/3581; G01N 21/35; G01N 21/3586; G01N 15/1459; G01N 15/1484;
(Continued)

(56) References Cited

U.S. PATENT DOCUMENTS

2006/0027317 A1* 2/2006 Joseph ................ B01L 3/50851 156/272.2
2006/0030035 A1* 2/2006 Joseph ................ B01L 3/50851 435/288.4
(Continued)

FOREIGN PATENT DOCUMENTS

CN 202083469 A 12/2011
CN 103364363 A 10/2013
(Continued)

OTHER PUBLICATIONS

He,Mingxia et al.,Analysis of Terahertz-Wave Spectroscopy for Basal Cell Carcinoma Tissue,Chinese Journal Spectroscopy Laboratory,Mar. 31, 2013.
(Continued)

*Primary Examiner* — Taeho Jo
(74) *Attorney, Agent, or Firm* — Wayne & Ken, LLC; Tony Horn

(57) ABSTRACT

Disclosed is a method of enhancing absorption spectral signals of a biological sample in a terahertz waveband in which the biological sample are embedded and supported with black silicon. In the method, the biological sample are filled between the surface micro-nano structures of a black silicon material and then freeze-dried. When the terahertz wave is incident upon the black silicon material, multiple reflections will occur between the micro-nano structures, so that the terahertz wave passes through the biological sample multiple times to increase the distance of interaction between the terahertz waves and the biological sample, allowing for enhanced absorption spectral signals of the
(Continued)

biological sample and improved identifiability of the biological sample. The method is simple and easy to implement and low in cost.

1 Claim, 3 Drawing Sheets

Figure 1:
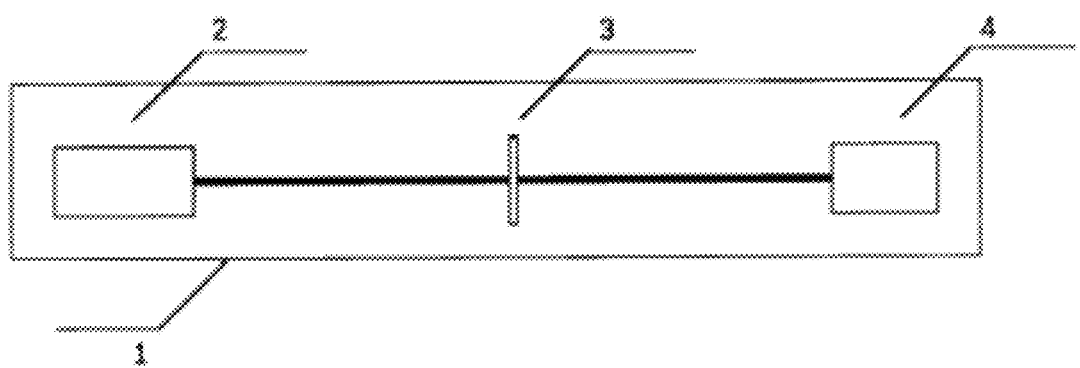

(51) Int. Cl.
*G01N 1/36* (2006.01)
*G01N 1/42* (2006.01)

(58) Field of Classification Search
CPC .... G01N 21/00; G01N 21/6486; G01N 21/75; G01N 21/81; G01N 2201/0612; G01N 33/4833
USPC ...................................................... 250/341.1
See application file for complete search history.

(56) References Cited

U.S. PATENT DOCUMENTS

| | | | |
|---|---|---|---|
| 2006/0030036 A1* | 2/2006 | Joseph | B01L 3/50851 435/288.4 |
| 2010/0017922 A1* | 1/2010 | Shin | B82Y 20/00 850/21 |
| 2011/0127432 A1* | 6/2011 | Federici | G01N 21/3581 250/339.07 |
| 2011/0253897 A1* | 10/2011 | Saeedkia | G01N 21/3581 250/358.1 |
| 2013/0096033 A1* | 4/2013 | Routenberg | C40B 50/06 506/26 |
| 2013/0206611 A1* | 8/2013 | Kulmala | G01N 21/66 205/780.5 |
| 2014/0103211 A1* | 4/2014 | Darcie | H01L 31/0224 250/338.4 |

FOREIGN PATENT DOCUMENTS

| | | |
|---|---|---|
| CN | 103919529 A | 7/2014 |
| CN | 105136718 A | 12/2015 |
| CN | 105445219 A | 3/2016 |
| GB | 2415777 | 1/2006 |
| JP | 2010038809 A | 2/2010 |

OTHER PUBLICATIONS

Peng,Yan et al.,Ultra-broadband Terahertz Perfect Absorber by Exciting Multi-order Diffractions in a Doublelayered Grating Structure,Optical Society of America,Jan. 26, 2015.
Qi,Na et al.,Application of Terahertz Technology in Medical Testing and Diagnosis,Spectroscopy and Spectral Analysisis,Aug. 31, 2013.
Hoyer p et al.,Terahertz emission from black silicon,Applied Physics Letters,Sep. 3, 2008.
Howard M. Branz et al.,Nanostructured black silicon and the optical reflectance of graded-density surfaces,Applied Physics Letters,Jun. 11, 2009.
Shen,Ze'nan et al.,Advances in Fabrication and Application of Black Silicon,Research & Pro gress of SSE,Aug. 31, 2011.
Peng,Yan et al.,Quantitative analysis for micro/nano-structure silicon with wide spectrum and high absorption efficiency,Optical Instruments,Oct. 31, 2015.

* cited by examiner

METHOD OF ENHANCING ABSORPTION SPECTRAL SIGNALS OF BIOLOGICAL SAMPLES IN TERAHERTZ WAVEBANDS

TECHNICAL FIELD

The present invention relates to a signal enhancement technique, and in particular to a method of enhancing absorption spectral signals of biological samples in terahertz wavebands.

BACKGROUND OF THE PRESENT INVENTION

In recent decades, terahertz wave has become an important research topic in the physics because of its wide application prospect. The terahertz radiation is an electromagnetic wave with a frequency ranging from 0.1 to 10 THz. Such wave, with abundant information, high spatial-temporal coherence, low photon energy, etc., is located between the microwave and the infrared, and is of great values in astronomy, biology, computer science, communications and other applications. At present, main application researches include terahertz time-domain spectroscopy, terahertz imaging, security check, terahertz radar, astronomy and communications.

The emergence and development of the terahertz spectroscopy provides a new breakthrough for the biomedical research. Researches in recent years have indicated that for most biological molecules, the rotational energy level, vibrational energy level and weak intermolecular interaction energy level are located in the terahertz waveband. Weak intermolecular interaction involves hydrogen bonds existing in many molecules, and the rotational and vibrational motions of the molecules also fall exactly in the terahertz waveband. Therefore, the technique of terahertz spectroscopy can be used to study the spectral and kinetic properties of biomolecules.

Currently, in the biological detection using terahertz spectroscopy, methods for preparing biological samples generally include paraffin-embedding, tableting with PE powder, sandwiching with Teflon and so on.

However, these methods have their disadvantages. For example, for the paraffin-embedding method, the samples may have a high moisture content, which will affect the transmission of terahertz signals, and then reduce the amplitude of the detected terahertz signal significantly; for the method of tableting with PE powder, when there are relatively fewer biological samples, the area where terahertz waves act upon the samples is very small and then it will be very difficult to find characteristic peaks in spectrum; the method of sandwiching with Teflon is only applicable to the case where the sample size is sufficient large and the moisture content is low.

Therefore, there is a need to solve the problems existing in the biological sample detection, namely, the small number of samples and the moisture in the samples, which leads to the absorption spectral signals too weak or even mixed with the background noise and thus difficult to distinguish. So far, no effective methods have been proposed to solve the above problems.

SUMMARY OF THE PRESENT INVENTION

In order to solve the above problems, the present invention provides a method of enhancing absorption spectral signals of a biological sample in a terahertz waveband, in which the biological samples are embedded and supported with black silicon. In the method, the biological sample are filled between the surface micro-nano structures of a black silicon material and then freeze-dried. When the terahertz wave is incident upon the black silicon material, multiple reflections will occur between the micro-nano structures. Therefore, the terahertz wave passes through the biological sample multiple times to increase the distance of interaction between the terahertz waves and the biological sample, allowing for enhanced absorption spectral signals of the biological sample and improved identifiability of the biological sample.

Specifically, the present invention provides a method of enhancing absorption spectral signals of a biological sample in a terahertz waveband, comprising:

1) filling surface micro-nano structures of a black silicon material with the biological sample to form a black silicon sample sheet, and freezing the black silicon sample sheet in a freeze dryer at −80° C. for 2 hours and then drying the black silicon sample sheet in a vacuum chamber for 12 hours;

2) placing a terahertz source, a detection frame and a signal detector successively on a single axis and then the same in a measurement box; placing the black silicon sample sheet prepared in the step 1) on the detection frame; closing the measurement box and introducing dry gases into the measurement box; and 3) turning on the terahertz source when an ambient humidity of the measurement box is reduced to 5% or lower, so that terahertz waves generated by the terahertz source are incident on a first surface of the black silicon sample sheet carried on the detection frame; wherein the surface micro-nano structures of the black silicon sample sheet enable the incident terahertz waves to be reflected multiple times and pass through the biological sample that are filled between the micro-nano structures, and the terahertz waves carrying characteristic signals of the biological sample emerge from a second surface of the black silicon sample sheet opposite to the first surface, and are detected and received by the signal detector; and the enhanced absorption spectra of the biological sample is obtained after calculation and analysis.

The present invention has the following advantages. The method of enhancing absorption spectral signals of a biological sample in a terahertz waveband of the present invention employs simple devices and is easy to implement. By simply filling the biological sample between the surface micro-nano structures of the black silicon material and then freeze-dried, when the terahertz wave is incident upon the black silicon material, multiple reflections will occur between the surface micro-nano structures of the black silicon material, so that the terahertz wave passes through the biological sample multiple times to increase the distance of interaction between the terahertz waves and the biological sample, allowing for enhanced absorption spectral signals of the biological sample and improved identifiability of the biological sample.

BRIEF DESCRIPTION OF THE DRAWINGS

FIG. 1 is a schematic diagram for implementing the method of enhancing absorption spectral signals of a biological sample in a terahertz waveband according to the present invention.

FIG. 2 is a schematic diagram showing the terahertz waves are reflected multiple times between micro-nano-structures of the black silicon and pass through the sample in the method of enhancing absorption spectral signals of biological samples in terahertz wavebands according to the present invention.

Figure 3:
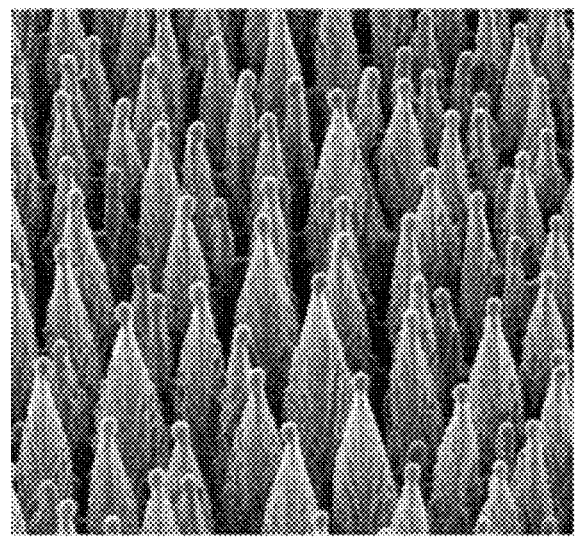

FIG. 3 is a scanning electron micrograph of the surface of the black silicon material used in the method of enhancing absorption spectral signals of biological samples in terahertz wavebands according to the present invention.

DETAILED DESCRIPTION OF THE PRESENT INVENTION

Referring to FIG. 1, there is a schematic diagram for implementing the method of enhancing absorption spectral signals of biological samples in terahertz wavebands, consisting of a measurement box 1, a terahertz source 2, a detection frame 3 and a signal detector 4.

Detection devices are placed in the closed measured box 1 filled with dry gases where the terahertz source 2, the detection frame 3 and the signal detector 4 are successively arranged on a single axis. Terahertz waves generated by the terahertz source 2 are incident on a first surface of a black silicon sample sheet, which is formed by filling the sample between the surface micro-nano structures of the black silicon material, carried on the detection frame 3. The surface micro-nano structures of the black silicon sample sheet enable the incident terahertz waves to be reflected multiple times and pass through the biological sample that are filled between the micro-nano structures, and the terahertz waves carrying characteristic signals of the biological sample emerge from a second surface of the black silicon sample sheet opposite to the first surface, and are detected and received by the signal detector; and the enhanced absorption spectra of the biological sample can be obtained through calculation and analysis.

In the embodiment as will be described below, description is made by way of example with respect to a case where the black silicon sample sheet is used as a carrier for embedding and supporting the biological sample and placed in a spectrometer which generates terahertz waves by means of a photoconductive antenna for scanning and measurement. The implementation of other biological sample and spectrometers is basically the same as that of this embodiment.

First, two black silicon materials with the same parameters, one for reference signal test and the other for biological sample test, are prepared by a laser ablation method. The biological sample to be detected are filled between the surface micro-nano structure of one black silicon material, which is freeze-dried in a freeze dryer at −80° C. for 2 hours and then vacuum dried in a vacuum chamber for 12 hours or longer.

Figure 2:
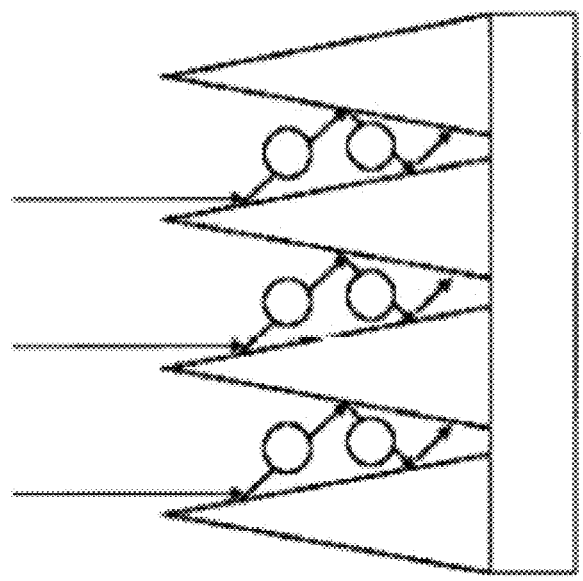

Specifically, the method of enhancing absorption spectral signals of a biological sample in a terahertz wavebands is described as follows. Dry gases are introduced into the measurement box 1. When the ambient humidity of the measurement box is reduced to 5% or lower (the humidity in the box needs to be always 5% or lower during the whole measurement process), the terahertz spectrometer is turned on so that the terahertz source 2 generates terahertz waves. A clean black silicon sample sheet on which no samples are coated is placed on the detection frame 3, and the signal received by the signal detector 4 at this time serves as a reference signal. The time-domain spectrum of the clean black silicon sample sheet is obtained through measurement, and then converted by Fourier transform into the frequency-domain spectrum which is used as a reference signal. Subsequently, the clean black silicon sample sheet is removed from the detection frame 3, and a black silicon sample sheet that has been filled with the biological sample and subjected to the freeze-drying treatment is placed on the detection frame 3. Referring to FIG. 2, there is a schematic diagram illustrating the terahertz waves are reflected multiple times between micro-nanostructures of the black silicon and pass through the sample. When the terahertz wave is incident on the black silicon material, multiple reflections will occur between the micro-nano structures, so that the terahertz wave passes through the biological sample multiple times to increase the distance of interaction between the terahertz waves and the biological sample. The time-domain spectrum of the sample is collected and detected by the detector 4, and converted by Fourier transform to obtain the frequency-domain spectrum as a sample signal. By dividing the reference signal by the sample signal and taking a logarithm, the terahertz absorption peaks of the biological sample is obtained. Referring to FIG. 3, there is a scanning electron micrograph of the surface of the black silicon material used in the method of enhancing absorption spectral signals of biological samples in terahertz wavebands according to the present invention. If a comparison needs to be made between different materials or different methods with respect to the effects in enhancing the absorption spectral signals, it is possible to further detect the absorption spectral signals for an ordinary silicon sheet and a Teflon sheet, with their flat surfaces coated with the same sample and subjected to the same freeze-drying treatment, and then perform the data analysis separately. It can be found the spectral signals and absorption peaks of the biological sample filled between the black silicon micro-nanostructures will be significantly enhanced and improved. The method is simple and easy to implement, and has significant effects but low cost.

What is claimed is:

1. A method of enhancing absorption spectral signals of a biological sample in a terahertz waveband, comprising:
   1) filling surface micro-nano structures of a black silicon material with the biological sample to form a black silicon sample sheet, and freezing the black silicon sample sheet in a freeze dryer at −80° C. for 2 hours and then drying the black silicon sample sheet in a vacuum chamber for 12 hours;
   2) placing a terahertz source, a detection frame and a signal detector successively on a single axis and then putting the terahertz source, the detection frame and the signal detector in a measurement box; placing the black silicon sample sheet prepared in the step 1) on the detection frame; closing the measurement box and introducing dry gases into the measurement box; and
   3) turning on the terahertz source when an ambient humidity of the measurement box is reduced to 5% or lower, so that terahertz waves generated by the terahertz source are incident on a first surface of the black silicon sample sheet carried on the detection frame; wherein the surface micro-nano structures of the black silicon sample sheet enable the incident terahertz waves to be reflected multiple times and pass through the biological sample that are filled between the micro-nano structures; the terahertz waves carrying characteristic signals of the biological sample emerge from a second surface of the black silicon sample sheet opposite to the first surface, and are detected and received by the signal detector; and the enhanced absorption spectra of the biological sample is obtained after calculation and analysis.

* * * * *